United States Patent [19]

Lezier et al.

[11] 4,192,638

[45] Mar. 11, 1980

[54] MOLDING DEVICE HAVING HEAT TRANSFER CHAMBERS INSULATED FROM EACH OTHER FOR MOLDING EXPANDABLE THERMOPLASTIC RESIN PARTICLES

[76] Inventors: Gérard Lezier, 1 boulevard Mariette, 62200 Boulogne-sur-Mer; Bernard Vasseur, Beaudricourt, 62810 Avesnes-le-Comte, both of France

[21] Appl. No.: 904,220

[22] Filed: May 19, 1978

Related U.S. Application Data

[63] Continuation-in-part of Ser. No. 796,609, May 13, 1977, abandoned.

[30] Foreign Application Priority Data

May 17, 1976 [FR] France ............................... 76 14779

[51] Int. Cl.² .................................................. B29D 27/00
[52] U.S. Cl. ...................................... 425/256; 249/79; 249/113; 264/51; 425/817 R
[58] Field of Search .......................... 249/79, 78, 113; 264/51; 425/4 R, 817 R, 256

[56] References Cited

U.S. PATENT DOCUMENTS

| | | | |
|---|---|---|---|
| 2,435,170 | 1/1948 | Wachs et al. | 249/79 X |
| 2,471,739 | 5/1949 | Gregg | 249/78 X |
| 2,759,230 | 8/1956 | Gordon et al. | 249/78 |
| 3,424,827 | 1/1969 | Galizia et al. | 264/51 |
| 3,454,988 | 7/1969 | Cremer | 249/79 X |
| 3,587,134 | 6/1971 | Premo | 425/4 R X |
| 3,671,168 | 6/1972 | Nussbaum | 425/817 R X |
| 3,837,769 | 9/1974 | Erlenbach | 425/4 R |
| 3,941,528 | 3/1976 | Cotterell | 264/51 X |

FOREIGN PATENT DOCUMENTS

| | | | |
|---|---|---|---|
| 2043982 | 3/1972 | Fed. Rep. of Germany | 249/79 |
| 2150046 | 4/1973 | Fed. Rep. of Germany | 425/4 R |
| 1488918 | 7/1967 | France | 425/4 R |
| 2225270 | 12/1974 | France | 425/4 R |
| 972861 | 10/1964 | United Kingdom | 425/4 R |

Primary Examiner—Philip Anderson
Attorney, Agent, or Firm—Cameron, Kerkam, Sutton, Stowell & Stowell

[57] ABSTRACT

A mold for polystyrene has two spaced dies receiving the polystyrene therebetween. The wall of each die has two superposed independent chambers, one a heating chamber and the other a cooling chamber adjacent the die surface. Passages from the heating chamber pass through the cooling chamber and through the die surface and do not communicate with the cooling chamber. The opening of the passages in the die surface may be partially closed by nozzles.

7 Claims, 10 Drawing Figures

4,192,638

MOLDING DEVICE HAVING HEAT TRANSFER CHAMBERS INSULATED FROM EACH OTHER FOR MOLDING EXPANDABLE THERMOPLASTIC RESIN PARTICLES

This is a continuation-in-part of our patent application Ser. No. 796,609 filed May 13, 1977 now abandoned which relates to a device for molding expansible particulate materials and especially expansible polystyrene particles.

In order to obtain articles of predetermined shapes, expansible materials are molded in a press in which the essential element is a molding device constituted as a general rule by a number of molds, the dies of which are brought together along a line of joints.

The pre-expanded particulate material is introduced into the mold by injections. After an increase in temperature of the order of 120° C., the molding heat is obtained by means of steam which is introduced into a chamber which surrounds the molds.

A device of this type, described hereinafter in detail, suffers from the disadvantage of high power consumption and relatively long molding times. Furthermore, the replacement of a single die makes it necessary to replace all the dies which are located on the same side of the device.

The present invention makes it possible to overcome these disadvantages by making fundamental changes in design concept, in the attachment of the dies and in the design of the heating and cooling system.

The invention is concerned with a molding device for expanded resin products and especially for expanded or foamed polystyrene. The device essentially comprises a plurality of molds each constituted by two dies having a small mass and low heat capacity. Said dies are pierced by a large number of holes for the passage of steam or other gases and are mounted separately and detachably on the two opposite faces of two frames which can be applied against each other along a joint line. The interior of each frame is formed of heat-insulating material in which is connected at least one inlet and one outlet for gas or steam as well as one inlet and one outlet for water.

The dies are preferably formed of material selected from aluminium or another metal or of resin which ensures good heat transfer. In particular, said dies can be constituted by Araldite and aluminium.

The dies have a thickness of the order of 2 mm and are pierced by a large number of holes having a diameter of approximately 0.5 mm. Said dies are fixed on their respective frame by insertion in openings formed in one plate which is fixed on the frame and consequently forms one wall of this latter.

The heat-insulating material which constitutes the interior of the frame is a hard resin surrounded by a closed cellular resin having high insulating power. The heat-insulating material is traversed by channels and these latter open into a zone which surrounds each die. By way of alternative, the heat-insulating material can be sufficiently porous to permit the flow of the fluids required for the molding operation, thus avoiding the need for channels.

By means of this arrangement, disassembly of the dies can be carried out easily and rapidly, thus making it possible to gain access to certain parts of the device and to carry out cleaning of these latter if necessary.

The dies can be replaced one by one without entailing the need to change all the dies entirely.

The amount of power employed in the molding operation is relatively small. It is in fact estimated that the molding of one kilogram of expansible polystyrene particles requires only 2 to 3 kg of steam whereas 28 to 35 kg are required in the case of traditional molds. An improvement by a factor of approximately 10 is accordingly achieved.

Further properties and advantages of the invention will become apparent from the following description of a particular embodiment of the invention which is given in comparison with a known device, reference being had to the accompanying drawings, wherein.

Figure 1:
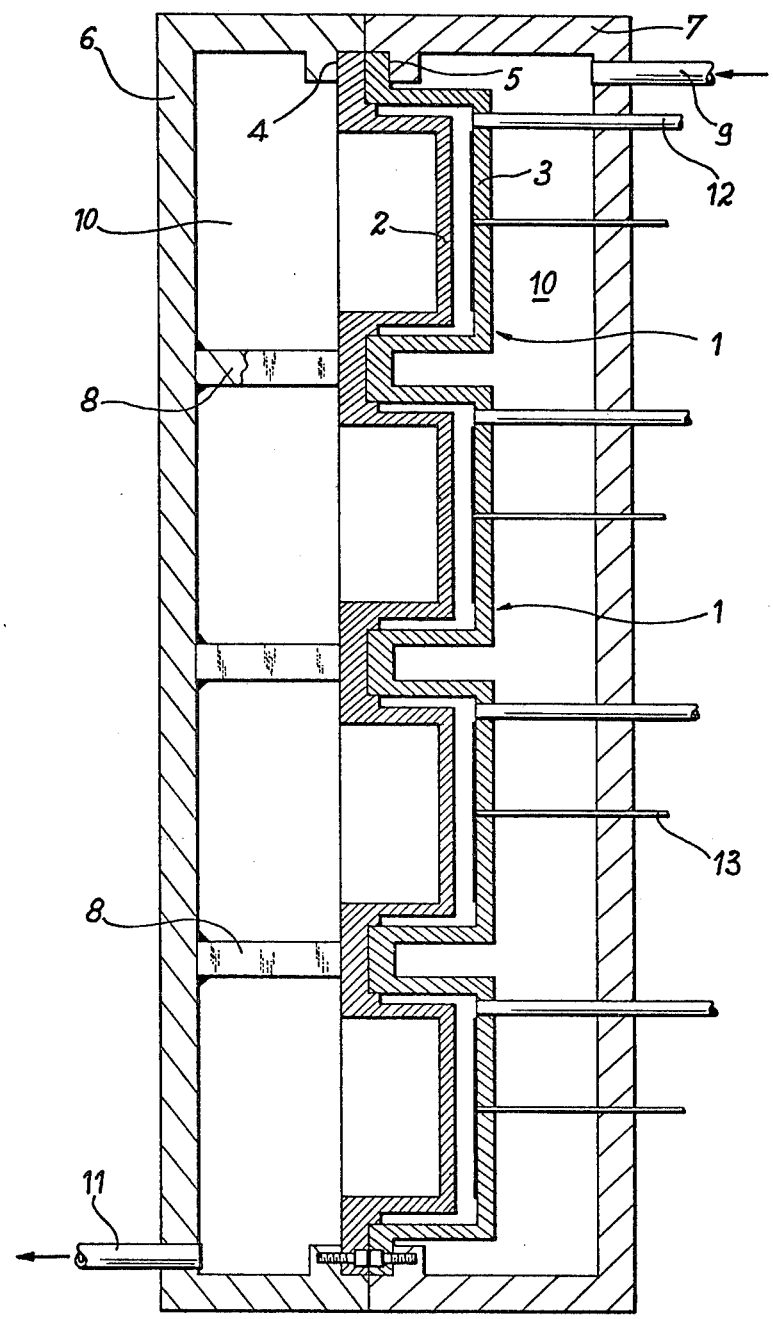
FIG. 1 illustrates a molding device of a known prior art type.

The device which is illustrated in FIG. 1 is of the type employed for molding articles of expanded or foamed polystyrene and comprises a plurality of molds 1 each constituted by two dies 2 and 3 which are generally of aluminium and of relatively substantial thickness in comparison with the dies of the molds in accordance with the invention.

Said dies 2 and 3 which are pierced by a large number of holes for the passage of steam and other fluids employed during the molding process are placed side by side and constitute a single block which is fixed on a shoulder 4 in the case of the dies 2 or on a shoulder 5 in the case of the dies 3; these shoulders constitute the inner edge respectively of the frames 6 and 7.

It is observed that provision is made in the frame 6 for distance-pieces 8 which have the effect of strengthening the dies 2 and maintaining these latter in position. Injection of steam is carried out by means of the pipe 9 and this latter opens into the entire space which surrounds the molds within the frames. The steam is discharged through the outlet pipe 11. It is pointed out that the pipe 12 is designed for the injection of said particulate plastic material in the preexpanded state and that the molded article can readily be detached on completion of the molding operation by means of a scraper-blade 13.

A device of this type suffers from many disadvantages in that molds having a relatively large mass require a large amount of energy in order to be heated. It is estimated that the weight of the mold is 250 kg in order to mold 100 g of polystyrene, namely 10 parts each weighing 10 g., for example.

Figure 2:
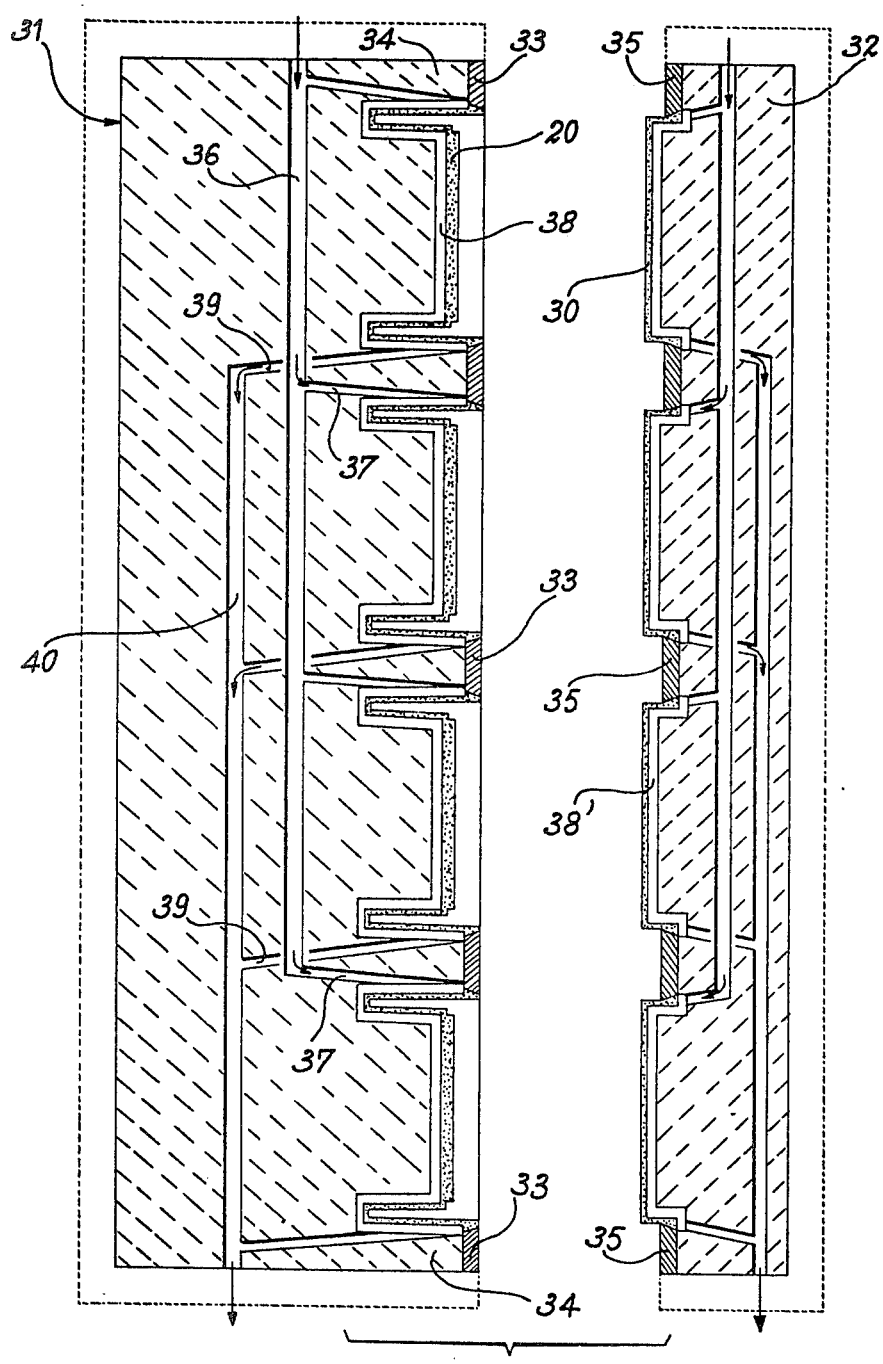
FIG. 2 illustrates one embodiment of a device in accordance with the invention.

In FIG. 2, the device in accordance with the invention comprises a number of mold cavities each defined by two opposed dies 20 and 30 pierced by a large number of small holes each having a diameter of about 0.50 mm. These dies are of aluminium or of similar materials such that the molds are endowed both with a small mass and with satisfactory mechanical strength. Said dies are mounted on the opposite faces of two frames 31, 32. It is understood that, by bringing the two frames together, the dies 20 and 30 cooperate and thus form molds. The dies are separate and fixed by insertion in openings provided in a plate 33. The ends of said plate are fixed by any suitable means such as bolts on the edge 34 of the corresponding frame 31. The outer upper edge of each die 20 is tapered in order to match with the inner edge of said holes. The dies 20 are inserted (from the right to the left of FIG. 2) just before being secured to the frame 31. The plates 33 are preferably screwed in the edges 34 of the frame 31. Similarly, a plate 35 is provided with openings in which the dies are inserted and maintained in position. The interior of the frames 31 and 32 is constituted by a block of heat-insulating resin such as Araldite.

A manifold for the supply of steam, hot water or gas discharges into the frame through a duct 36 which is divided into branch ducts 37. Each branch duct supplies a system of channels (not shown) formed in a cavity 38, 38' (shown in FIG. 3) which is provided between the block of resin and the die.

The ducts 39 which are identical with the ducts 37 extend from the outlets of the cavities 38 and each communicate with a duct 40 which opens into a discharge manifold.

Figure 3:
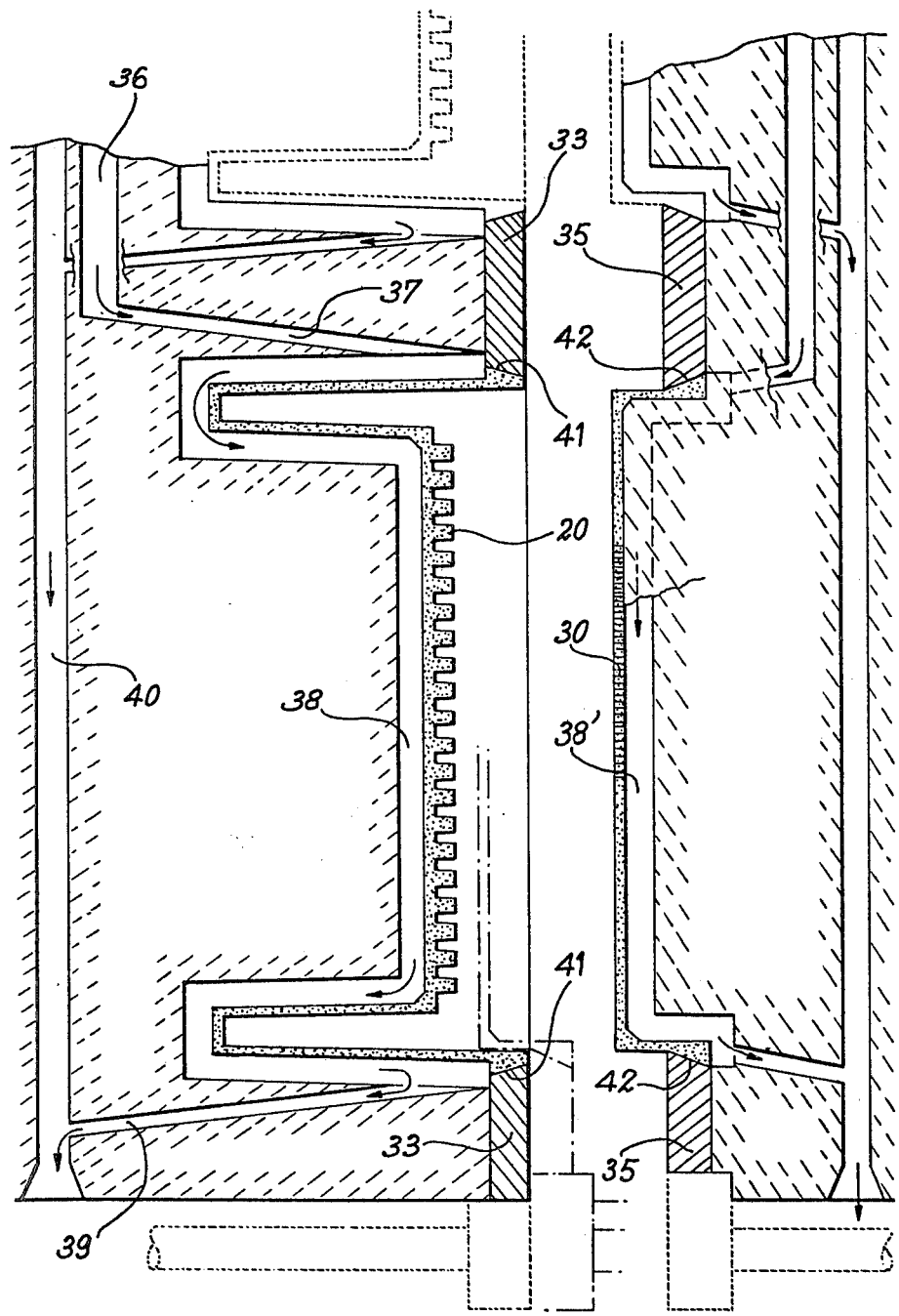
FIG. 3 is a detailed view of said device at the level of a single mold.

By referring more particularly to FIG. 3, it can be understood that a fluid admitted through the duct 36 is discharged through the duct 39 only after having flowed in contact with the external surface of the corresponding die (20 or 30) and since the die has a small mass, as compared to the known devices, it will clearly be necessary to have low power both in order to heat and to cool this latter. A noteworthy feature is the flexibility of assembly and disassembly of the dies since the slope of the frusto-conical base 41 or 42 of each die is reverse to the slope of the openings which are formed in the plate 33 or 35 and which are also frusto-conical. If necessary, it is therefore possible to replace each die independently of the others.

Figure 5:
FIG. 5 is a sectional view showing the profile of said channels.

In FIG. 3, there is shown the interior of the cavity 38, 38' which is traversed by channels 43, the profile of which is shown in FIG. 5. These channels ensure uniform distribution of the fluid employed and intimate contact of this latter with the mold before it is discharged into the duct 39. Furthermore, the mechanical strength of the dies is increased by the wall of said channels.

In accordance with another embodiment (not shown in the drawings), the system of supply channels which traverse the resin can be dispensed with by making use of a porous resin through which a fluid is readily permitted to flow.

Figure 6:
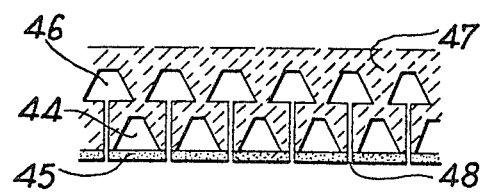
FIG. 6 is a sectional view showing the profile of two systems of superposed channels.
Figure 4:
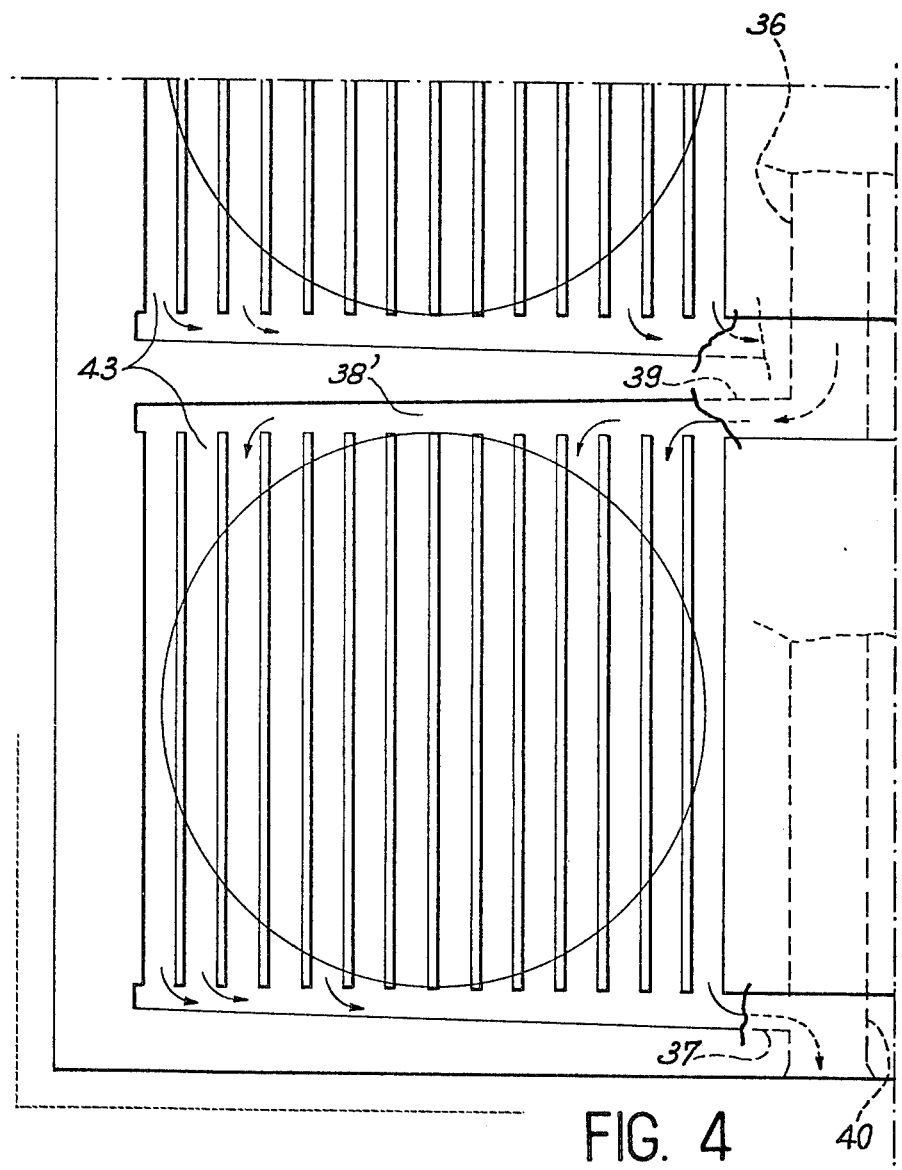
FIG. 4 illustrates the arrangement of the channels in the vicinity of one wall of a die.

In accordance with another embodiment shown in FIG. 6, the walls of the dies are provided with two systems of channels which are superposed and embedded in the die material. Provision is made for a first system of channels 44 for the circulation of cooling water, the wall 45 of which is not pierced with holes in order to prevent admission of water into the polystyrene at the time of cooling and discharge and for a second system of channels 46 for the circulation of steam during the molding operation and for the circulation of air during removal from the mold. The material 47 in which the two systems of channels are embedded is pierced by a large number of holes 48 in order to permit the passage of steam at the time of molding and of air at the time of discharge of molded products.

These arrangements and especially the holes formed between the systems avoid the need to provide for removal of air during injection of the expansible polystyrene particles.

Figure 7:
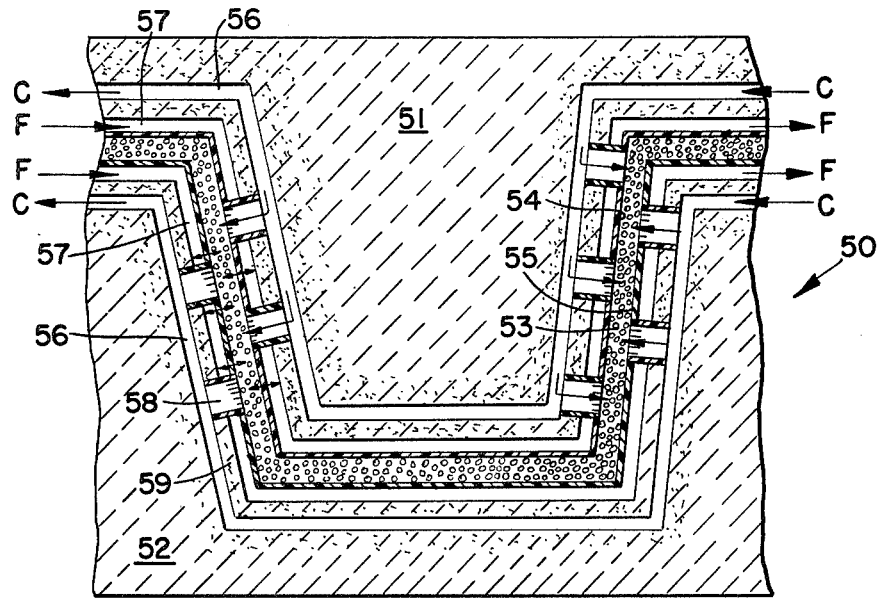
FIG. 7 is a cross-section of a preferred embodiment of a mold.
Figure 8:
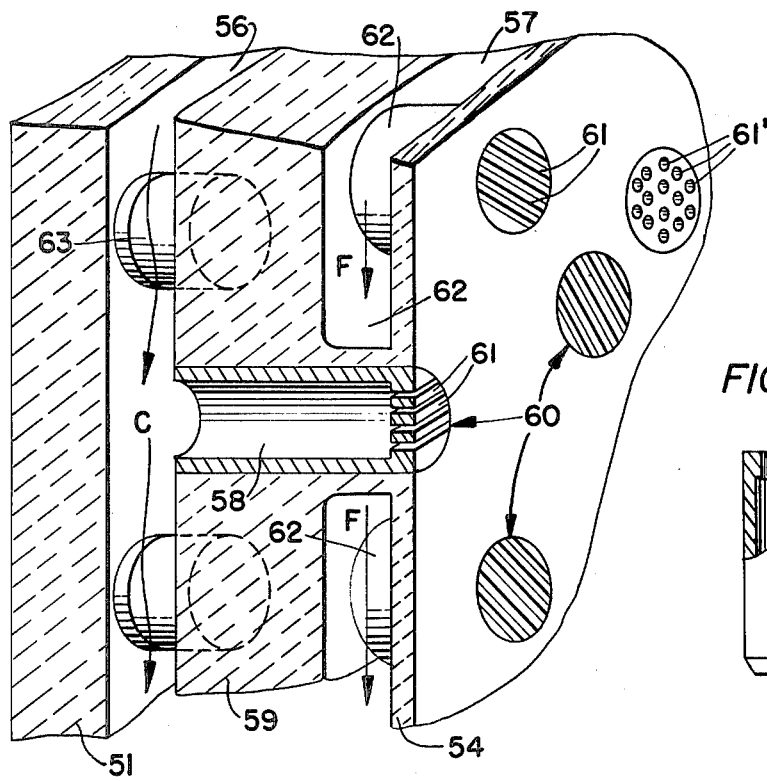
FIG. 8 is a partly cut view of the mold of FIG. 7.
Figure 9:
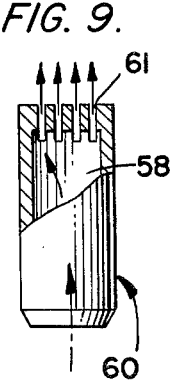
FIG. 9 is a part of FIG. 8.
Figure 10:
FIG. 10 is similar to FIG. 9 showing holes in the nozzles.

In FIG. 7 is shown a mold 50 comprising two elements 51 and 52 which by bringing them towards each other are forming a free volume 53 which is in fact the very mold cavity into which the substance to be molded is fed. Volume 53 is bounded by dies 54 and 55 which bound in turn the facing elements 51 and 52.

These elements 51 and 52 have identical structures and comprise two superposed parallel chambers 56 and 57 for heating and cooling respectively. Passages such as 58 starting from chamber 56 across the wall 59 formed from a heat-insulating resin material separating the two chambers and lead to the mold cavity surfaces of the dies 54, 55. These passages are defined by conduits or nozzles 60 which are metallic and pierced with slots 61 or holes 61' of 0,5–0,6 mm width or holes with a diameter of 0,5–0,6 mm depending on the desired relief surface of the molded article.

The conduits 60 are not connected with the cooling chambers 57 but are surrounded by the heat-insulating resin material of the studs 62. In the chamber 56 are provided studs 63 which strengthen the structure and are acting as deflectors with respect to the fluid which flows in chamber 56. These studs are shifted with respect to studs 62 which also act as deflectors.

Briefly the device works as follows:

As soon as the two elements 51 and 52 have been brought together the expansible thermoplastic resin material in the form of pre-expanded thermoplastic resin balls or beads is injected into the mold cavity or volume 53. A heating fluid C is fed into chamber 56 which flows around the studs 63 and is therefor uniformly distributed in chamber 56 and then flows through the nozzles 60 into the mold cavity of volume 53 where the pre-expanded resin balls or beads are heated to just about their softening point, the porogen or blowing agent which they contain initiates a second expansion and their welding or coalescing together. A cold fluid F is fed into chamber 57 which flows around studs 62 and cools the dies 54, 55. The mold walls have a thickness of about 1,5 mm and are substantially heated within a few minutes, the remaining part of the wall being approximately at 10° C. below the welding temperature, this explaining the efficiency of the cooling step. The mold is thereafter opened and the article ejected. It must be noted that the hot water vapor or steam consumption is about 1 kg per 1 kg of treated expansible polystyrene.

About the manufacture of the molds we note that they are either casted in one part by sequential casts or formed with two parts which are imbedded one into the other.

In the appended table are given two ways of using the device depending on the fluid being either water or air. The surface area of the molds is 0,250 m² and the width of the molded article is 12 mm. The duration of each step is given as well as the total duration which are equal in both cases.

The flow rate of hot air is 30 liters per second for a 100 m² surface at a water column of 1 500 m, the stabilization duration is shorter than in the case of heated water vapor or steam but in both cases the obtained article is very dry.

It is readily apparent that the embodiments described in the foregoing are not given in any limiting sense and that many modifications and alternative forms could be made by those versed in the art without thereby departing either from the scope or the spirit of the invention. In particular, the invention is not limited to the molding of expansible polystyrenes but applies to the molding of all particulate expansible thermoplastic resin materials having a conversion temperature which is compatible with the strength of the material constituting the dies.

TABLE

| Steps | Fluids | |
|---|---|---|
| | water | air |
| Closing the device | 2 sec | 2 sec |
| Injecting the expansible thermoplastic resin balls or beads with a pistol or filler gun | 3 sec | 3 sec |
| Injecting heated water vapor or steam | 1–2 psi | |
| Injecting heated water vapor or steam by the nozzles into the expansible thermoplastic resin balls | 2 sec | |
| Injecting air at 250° F. by the nozzles into the expansible thermoplastic resin balls or beads | | 4 sec |
| Water cooling | 2 sec | |
| Air cooling | | 4 sec |
| Stabilising | 7 sec | 3 sec |
| Opening the device | 2 sec | 2 sec |
| TOTAL | 18 sec | 18 sec |

We claim:

1. A molding device for the production of expanded thermoplastic resin articles from expansible thermoplastic resin particles such as expanded polystyrene beads comprising a plurality of mold cavities defined by two spaced mold elements including molding dies for each mold element, means adapted for feeding said mold cavities with said expansible thermoplastic resin particles to be molded and means adapted for supplying and removing heating and cooling fluids to and from said mold elements, wherein said elements each comprise two superimposed chambers independent and insulated from each other, an outer one of said chambers being a heating chamber, and the other of said chambers being a cooling chamber, said chambers being located substantially parallel with each other and with the surface of the dies defining the mold cavities, separate conduit passages extending from each of said heating chambers, said conduit passages leading to openings in the walls of said mold cavities, said mold being constructed of materials adapted to provide satisfactory mechanical strength during molding at temperatures of about 250° F. and at pressures of about 100 psi.

2. Device according to claim 1 wherein the heating fluid is steam or hot air and the cooling fluid is water.

3. Device according to claim 1 wherein the heating chamber walls and the cooling chamber walls are spaced by studs, the heating chamber studs being offset with respect to the cooling chamber studs.

4. Device according to claim 1 wherein the passages crossing the cooling chamber include nozzles which uniformly distribute the fluid flow.

5. Device according to claim 4 wherein the nozzles include either slots or holes and the width of the slots is about 0.5–0.6 mm and the diameter of the holes is about 0.5–0.6 mm.

6. Device according to claim 1 wherein the two mold elements are a plastic of the epoxy type.

7. Device according to claim 1 wherein the wall of the mold which is also part of the cooling chamber has a thickness of about 0.5–1.5 mm.

* * * * *